(12) United States Patent
Takakura et al.

(10) Patent No.: US 11,854,720 B2
(45) Date of Patent: Dec. 26, 2023

(54) WIRING MEMBER FOR SUPPRESSING INCREASE IN ARRANGMENT SPACE

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Ryuta Takakura, Mie (JP); Housei Mizuno, Mie (JP); Suguru Yasuda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 269 days.

(21) Appl. No.: 17/419,984

(22) PCT Filed: Jan. 18, 2019

(86) PCT No.: PCT/JP2019/001422
§ 371 (c)(1),
(2) Date: Jun. 30, 2021

(87) PCT Pub. No.: WO2020/148883
PCT Pub. Date: Jul. 23, 2020

(65) Prior Publication Data
US 2022/0068520 A1 Mar. 3, 2022

(51) Int. Cl.
*H01B 7/08* (2006.01)
*H01B 7/04* (2006.01)
(Continued)

(52) U.S. Cl.
CPC .......... *H01B 7/08* (2013.01); *B60R 16/0215* (2013.01); *H01B 7/009* (2013.01); *H01B 7/04* (2013.01)

(58) Field of Classification Search
CPC ...... H01B 7/0846; H01B 7/0045; H01B 7/08; H01B 7/009; H01B 7/04; B60R 16/0215
(Continued)

(56) References Cited

U.S. PATENT DOCUMENTS 3,627,903 A * 12/1971 Plummer ............. H01B 7/0045
174/72 A
3,733,428 A * 5/1973 Fry ...................... H01B 7/0846
156/290
(Continued)

FOREIGN PATENT DOCUMENTS

JP   S58-168010 U   11/1983
JP   S59-018312 U   2/1984
JP   2018-137208 A  8/2018

OTHER PUBLICATIONS

International Search Report, IPO, Application No. PCT/JP2019/001422, dated Mar. 19, 2019, with English translation.
(Continued)

*Primary Examiner* — Timothy J Thompson
*Assistant Examiner* — Michael F McAllister
(74) *Attorney, Agent, or Firm* — Greenblum & Bernstein, P.L.C.

(57) ABSTRACT

A wiring member includes: a connector; a plurality of wire-like transmission members extending from the connector; and a sheet member in which the plurality of wire-like transmission members extending from the connector are disposed and fixed on a main surface in a state where an arrangement of the plurality of wire-like transmission members is changed to be different from an arrangement in an end surface of the connector. At least one intersection
(Continued)

position in which the plurality of wire-like transmission members intersect with each other for changing the arrangement of the plurality of wire-like transmission members is located in a backward region of the end surface of the connector.

6 Claims, 6 Drawing Sheets

(51) Int. Cl.
    *B60R 16/02*     (2006.01)
    *H01B 7/00*     (2006.01)

(58) Field of Classification Search
    USPC .............................................. 174/117 F, 27
    See application file for complete search history.

(56) References Cited

U.S. PATENT DOCUMENTS

| | | | | |
|---|---|---|---|---|
| 3,819,848 A * | 6/1974 | Fry | ...................... | H01B 7/0846 174/72 A |
| 3,836,415 A * | 9/1974 | Hilderbrandt | .... | H01B 13/01254 338/214 |
| 3,898,371 A * | 8/1975 | Bridgett | ............... | H01B 7/0846 174/72 A |
| 4,065,199 A * | 12/1977 | Andre | ...................... | H01B 7/08 174/72 A |
| 5,032,086 A * | 7/1991 | Skowronski | ......... | H01R 25/162 439/210 |
| 6,290,532 B1 * | 9/2001 | Vermeersch | ....... | H01R 13/6467 439/942 |
| 6,439,923 B1 * | 8/2002 | Kirkendall | ............. | H01R 27/02 439/502 |
| 6,585,528 B1 * | 7/2003 | Lin | .................... | H01R 13/6658 439/942 |
| 6,702,607 B2 * | 3/2004 | Kondo | ................ | B60R 16/0207 174/72 A |
| 8,916,773 B2 * | 12/2014 | Mok | ........................ | H01B 5/10 174/27 |
| 9,077,101 B2 * | 7/2015 | Wu | ........................ | H01R 12/53 |
| 10,867,721 B2 | 12/2020 | Ishida et al. | | |

OTHER PUBLICATIONS

Written Opinion, IPO, Application No. PCT/JP2019/001422, dated Mar. 19, 2019.

\* cited by examiner

F I G. 2
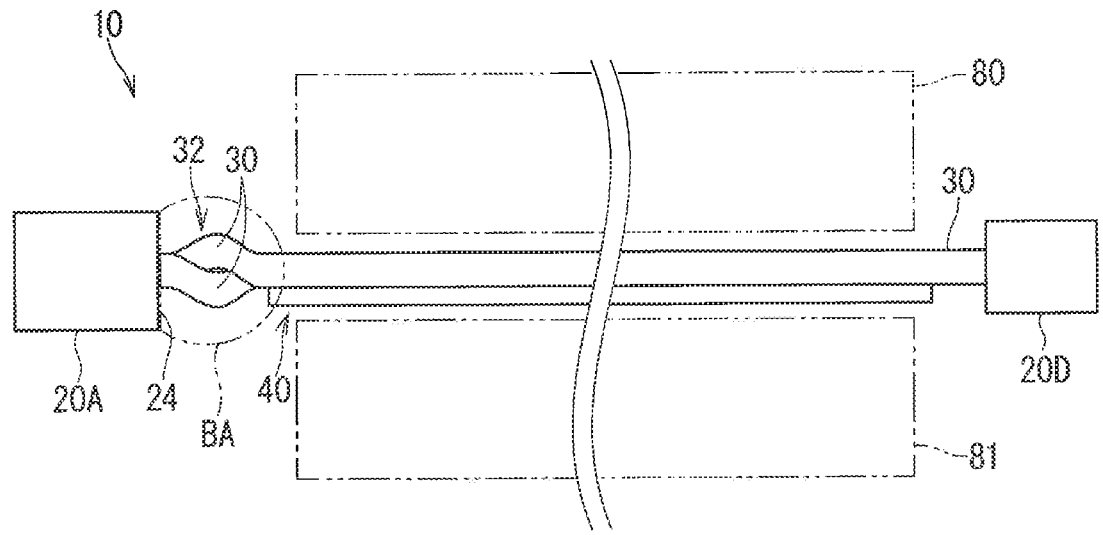
F I G. 3
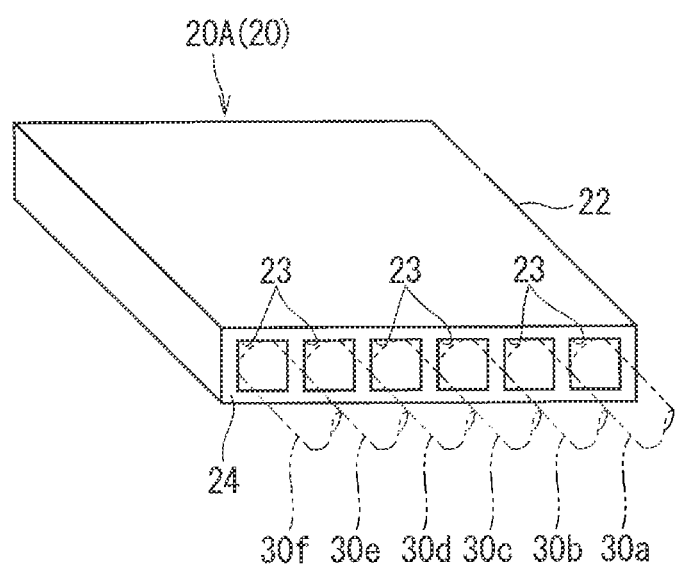

WIRING MEMBER FOR SUPPRESSING INCREASE IN ARRANGMENT SPACE

TECHNICAL FIELD

The present invention relates to a wiring member.

BACKGROUND ART

Patent Document 1 discloses a wire harness including: a functional exterior member formed into a sheet-like shape; and an electrical wire disposed to overlap with the functional exterior member in at least a part of a region along a longitudinal direction, wherein. at least a part of a portion where an insulating coating of the electrical wire and the functional exterior member overlap with each other is welded.

PRIOR ART DOCUMENTS

Patent Documents

Patent Document 1: Japanese Patent Application Laid-Open No. 2018-132708

SUMMARY

Problem to be Solved by the Invention

For example, there may be a case where in the wire harness disclosed in Patent Document 1, an electrical wire is disposed to intersect with and pass across the other electrical wire on the sheet-like functional exterior member in accordance with a route of the electrical wire and a position of a connection destination to a connector, for example.

However, when the electrical wires intersect with each other on the sheet-like functional exterior member, a thickness of the wire harness increases in that portion, and there is a possibility that an arrangement space for the wire harness in an arrangement position in a vehicle, for example, increases.

Accordingly, an object of the present invention is to provide a technique capable of suppressing increase in an arrangement space for a wire member in which a wire-like transmission member is fixed on a sheet member.

Means to Solve the Problem

In order to solve the above problem, a wiring member according to a first aspect includes: a connector; a plurality of wire-like transmission members extending from the connector; and a sheet member in which the plurality of wire-like transmission members extending from the connector are disposed and fixed on a main surface in a state where an arrangement of the plurality of wire-like transmission members is changed to be different from an arrangement in an end surface of the connector wherein at least one intersection position in which the plurality of wire-like transmission members intersect with each other for changing the arrangement of the plurality of wire-like transmission members is located in a backward region of the end surface of the connector, and the at least one intersection position includes an intersection position formed of one wire-like transmission member in the plurality of wire-like transmission members intersecting with two or more wire-like transmission members, which are different from the one wire-like transmission member, in the plurality of wire-like transmission members in different positions.

A wiring member according to a second aspect is the wiring member according to the first aspect, wherein the connector is provided separately from the sheet member.

A wiring member according to a third aspect is the wiring member according to the second aspect, wherein the at least one intersection position are provided between the connector and the sheet member.

A wiring member according to a fourth aspect is the wiring member according to the third aspect, wherein all of the intersection positions are provided between the connector and the sheet member.

A wiring member according to a fifth aspect is the wiring member according to the first aspect, wherein an end portion including the end surface of the connector is located on the sheet member.

A wiring member according to a sixth aspect is the wiring member according to any one of the first to fifth aspects, wherein the backward region is located between a fixing position, which is closest to the end surface of the connector in fixing positions of the sheet member and each of the wire-like transmission members, and the end surface of the connector.

Effects of the Invention

According to each aspect, the intersection position of the wire-like transmission members are located near the end surface where the wire-like transmission members are drawn in the connector. Herein, there is a case where the back side of the end surface of the connector is originally set to prevent entry of peripheral members so that a portion of the wire-like transmission member connected to the connector is protected. This portion is set to the backward region and the intersection position is disposed in the backward region, thus the backward region which tends to be a dead space can be effectively used. The number of intersection positions disposed in a portion away from the backward region can be reduced. Accordingly, increase in an arrangement space for the wiring member in which the wire-like transmission member is fixed on the sheet member can be suppressed.

According to the second aspect, the connector and the sheet member are separated from each other, thus the intersection position can be easily disposed outside the sheet member.

According to the third aspect, an overlap of the intersection position and the sheet member can be suppressed, thus increase in a thickness dimension in the intermediate portion of the wiring member can be suppressed.

According to the fourth aspect, none of the intersection positions is located on the sheet member, thus increase in a thickness dimension in the intermediate portion of the wiring member can be suppressed.

According to the fifth aspect, the connector is located on the sheet member, thus the position of the connector can be easily recognized.

According to the sixth aspect, the intersection position can be disposed between a fixing position, which is closest to the end surface of the connector in fixing positions of the sheet member and each of the wire-like transmission members, and the end surface of the connector.

BRIEF DESCRIPTION OF DRAWINGS

FIG. 2 A schematic side view illustrating a wiring member according to the first embodiment.

FIG. 3 A schematic perspective view illustrating a connector.

DESCRIPTION OF EMBODIMENT(S)

First Embodiment

Figure 1:
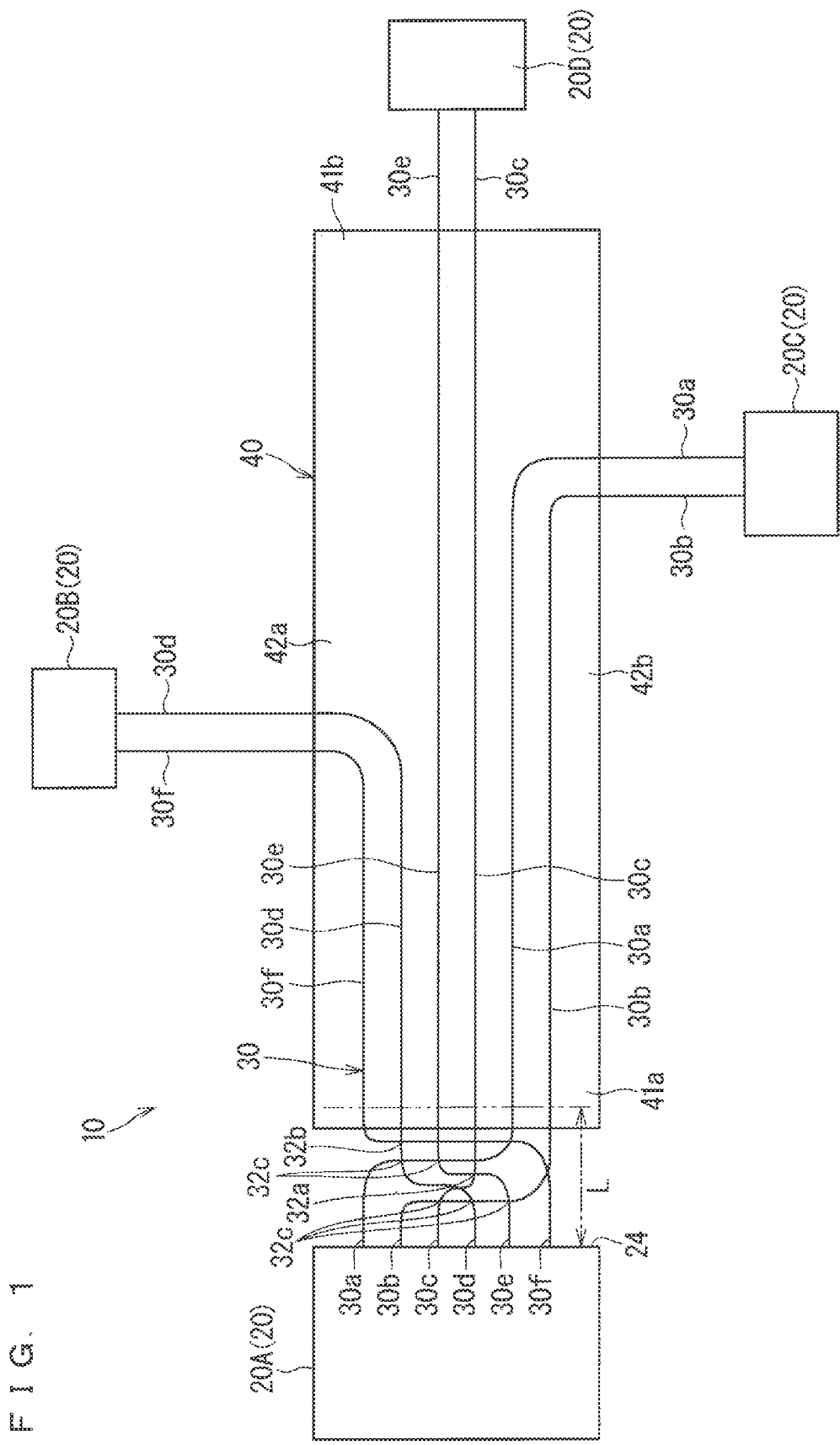
FIG. 1 A schematic plan view illustrating a wiring member according to a first embodiment.

A wiring member according to a first embodiment is described hereinafter. FIG. 1 is a schematic plan view illustrating a wiring member 10 according to the first embodiment. FIG. 2 is a schematic side view illustrating a wiring member 10 according to the first embodiment. FIG. 3 is a schematic perspective view illustrating a connector 20. In FIG. 1, the wire-like transmission member 30 is illustrated in a form of a line, and a dimension in a radial direction thereof is omitted. The same applies to cases illustrated in FIG. 4 and FIG. 6. In contrast, in FIG. 2 and FIG. 3, the wire-like transmission member 30 is illustrated without an omission of the dimension in the radial direction thereof. The same applies to cases illustrated in FIG. 5 and FIG. 7.

The wiring member 10 includes the connector 20, a plurality of wire-like transmission members 30, and a sheet member 40. Herein, the wiring member 10 includes the plurality of connectors 20. There may be a case where the wiring member 10 includes only one connector 20.

The connector 20 is a component to a component mounted to a vehicle. The wire-like transmission member 30 is a wire-like member transmitting electrical power or light. Each end portion of the plurality of wire-like transmission members 30 is connected to each connector 20. The connector 20 is connected to the component mounted to the vehicle, thus the wire-like transmission member 30 and the component are electrically connected or connected to be able to transmit and receive an optical signal.

The plurality of connectors 20 are connected to each component mounted to the vehicle in a state where the wiring member 10 is mounted to the vehicle. Accordingly, an electrical signal, electrical power, and an optical signal are transmitted and received between the components mounted to the vehicle. That is to say, the wiring member 10 is a wiring component connecting the components mounted to the vehicle to each other. Particularly, the plurality of wire-like transmission members 30 are branched in the wiring member 10, thus the wiring member 10 can connect the plurality of component via branched routes.

The sheet member 40 is a sheet-like member. A part of the plurality of wire-like transmission members 30 extending from the connectors 20 are fixed on the sheet member 40. Each of the plurality of wire-like transmission members 30 is fixed on the sheet member 40 in a state where an arrangement thereof is changed to be different from that in an end surface 24 of the connector 20.

A portion where the plurality of wire-like transmission members 30 intersect with each other for changing the arrangement of the plurality of wire-like transmission members 30 is referred to as an intersection position 32. At this time, at least one intersection position 32 is located on a backward region BA of the connector 20. The connector 20 is normally connected to the other side member from a side of an end surface located on a side opposite to the end surface 24 from which the wire-like transmission member 30 extends. Thus, in the present specification, the side of the end surface of the connector 20 located on the side opposite to the end surface 24 from which the wire-like transmission member 30 extends is referred to as a front side of the connector 20, and the side of the end surface 24 from which the wire-like transmission member 30 extends is referred to as a back side of the connector 20. A portion of an outer side of the connector 20 on the side of the end surface 24 is referred to as the backward region BA of the connector 20.

The backward region BA of the connector 20 can be defined as a region within a predetermined dimension L from the end surface 24 of the connector 20, for example. The predetermined dimension L can be set to 30 millimeter, for example. The predetermined dimension L can take a different value depending on a size of the connector 20, for example. The predetermined dimension L can be set to any value ranging from 10 millimeter to 30 millimeter, for example.

There is a case where a no-entry region preventing entry of peripheral members 80 and 81 is set in the back side of the connector 20. The no-entry region is set in a region within a predetermined dimension from the end surface 24 of the connector 20 to suppress a condition that the peripheral members 80 and 81 have contact with a portion of the wire-like transmission member 30 connected to the connector 20 and the wire-like transmission member 30 comes out of the connector 20, for example. In this manner, when a no-entry region preventing entry of the peripheral members 80 and 81 is set in the back side of the end surface 24 of the connector 20, the no-entry region can be determined as the backward region BA.

Each element is described more specifically.

The connector 20 includes a housing 22 and a connection member. The illustration of the connection member is omitted. herein.

The housing 22 is formed into a box-like shape by a material having insulation properties such as resin, for example, and houses the connection member therein. The wire-like transmission member 30 extends from one end surface 24 of the housing 22. For example, a cavity 23 housing the end portion of the wire-like transmission member 30 is formed in one end surface 24, and the end portion of the wire-like transmission member 30 is housed in the cavity 23. thus the wire-like transmission member 30 extends from one end surface 24 of the housing 22. In FIG. 3, the cavity 23 is formed with only one stage, but may be formed with two or more stages.

The connection member is a member intervening between the wire-like transmission member 30 and the other side of the connector 20 to transmit electrical power or light. The connection member is not particularly limited, however, a bus-bar or a terminal provided in the end portion of the wire-like transmission member 30, for example, can be used as the connection member. In the connector 20, the connection member is housed in the housing 22 in a predetermined arrangement. In the connector 20, the end portion of the wire-like transmission member 30 is connected to a corresponding connection member. Thus, the arrangement of the plurality of wire-like transmission members 30 in the end surface 24 of the connector 20 is an arrangement corresponding to the arrangement of the connection member.

It is sufficient that the wire-like transmission member 30 is a wire-like member transmitting electrical power or light, for example. For example, the wire-like transmission member 30 may be a general wire having a core wire and a covering around the core wire, or may also be a bare conductive wire, a shielded wire, an enamel wire, a nichrome wire, or an optical fiber.

The wire-like transmission member 30 transmitting the electrical power may be various kinds of signal lines or various kinds of power lines. The wire-like transmission member 30 transmitting the electrical power may be used as an antenna or coil, for example, transmitting or receiving a signal or electrical power to or from a space.

In the description herein, the wire-like transmission member 30 is a general wire 30 (simply referred to as the electrical wire 30 hereinafter). The electrical wire 30 includes a core wire as a transmission wire body and an insulating covering as a covering for covering the core wire. Each description on the electrical wire 30 is applicable to each exemplified object of the wire-like transmission member 30 except for a configuration to which the description is not applicable.

The core wire is made up of one or a plurality of strands. The strand is formed of a conductor made of copper, copper alloy, aluminum, or aluminum alloy, for example. When the core wire is made up of the plurality of strands, the plurality of strands may be stranded. The insulating covering is formed of a resin material such as polyvinyl chloride (PVC) or polyethylene (PE) extrusion-molded around the core wire. Herein, the electrical wire 30 is a so-called round wire 30 having a round shape in cross section.

Herein, the electrical wire 30 extends to join the connectors 20. That is to say, both end portions of the electrical wire 30 are connected to the different connectors 20, respectively. Only one end portion of the electrical wire 30 may be connected to the connector 20.

The sheet member 40 is a sheet-like member holding the electrical wire 30 in a state of two-dimensionally positioning the electrical wire 30. The sheet member 40 may have flexibility to be able to be bended or rigidity to be hardly bended.

A material constituting the sheet member 40 is not particularly limited, however, the sheet member 40 is preferably formed of a material containing resin of PVC, PE, polyethylene terephthalate (PET), or polypropylene (PP). The sheet member 40 may contain a metal material such as copper or aluminum.

The sheet material 40 may be made of a fibrous material such as a woven cloth, a knitted cloth, or a non-woven cloth, for example, or may be a molded sheet which does not have fiber but be bonded and molded by extrusion molding or injection molding. in the latter case, the sheet material 40 may be a foam molding sheet formed by foam molding, or may be a sheet with an inner portion evenly filled instead of the foam molding.

The sheet member 40 may be made up of a single layer or a plurality f stacked layers. When the sheet member 40 is made up of the plurality of stacked layers, it is considered that a resin layer and a resin layer are stacked, for example. It is also considered that a resin layer and a metal layer are stacked, for example.

The electrical wire 30 is fixed to one main surface of the sheet member 40. The electrical wire 30 is disposed and fixed along a predetermined route on one main surface of the sheet member 40.

Applicable as a state of fixing the electrical wire 30 and the sheet member 40 is a contact area fixation and a non-contact area fixation, or both fixations may be used together. Herein, the contact area fixation indicates that a portion where the electrical wire 30 and the sheet member 40 have contact with each other is stuck and fixed. The non-contact area fixation indicates the fixing state which is not the contact area fixation. For example, a sewing thread, the other sheet member 40, or an adhesive tape presses the electrical wire 30 toward the sheet member 40, or a sewing thread, the other sheet member 40, or an adhesive tape surrounds the electrical wire 30 and the sheet member 40, thereby holding the electrical wire 30 and the sheet member 40 to keep the electrical wire 30 and the sheet member 40 fixed to each other. In the present example, the electrical wire 30 and the sheet member 40 are in the state of the contact area fixation. Each description on the contact area fixation is also applicable to the non-contact area fixation as long as each member and material has a configuration to which the non-contact area fixation is not applicable.

Applicable as the configuration of the contact area fixation are a contact area indirect fixation and a contact area direct fixation, or both fixations may also be used together in different regions. Herein, the contact area indirect fixation indicates that the electrical wire 30 and the sheet member 40 are indirectly stuck and fixed via an intervening member such as an adhesive agent, a gluing agent, and a double-sided adhesive tape provided therebetween. The contact area direct fixation indicates that the electrical wire 30 and the sheet member 40 are directly stuck and fixed without an intervention of the adhesive agent, for example, which is separately provided. Considered in the contact area direct fixation is that resin included in at least one of the electrical wire 30 and the sheet member 40 is melted, thus the electrical wire 30 and the sheet member 40 are stuck and fixed, for example. In the description hereinafter, the electrical wire 30 and the sheet member 40 are in the state of the contact area direct fixation. Each description on the contact area direct fixation is also applicable to the contact area indirect fixation as long as each member and material has a configuration to which the contact area indirect fixation is applicable.

In forming the state of such a contact area direct fixation, the resin is considered to be melted by heat or a solvent, for example. That is to say, the state of the contact area direct fixation may be the state of the contact area direct fixation by the heat or the state of the contact area direct fixation by the solvent. The contact area direct fixation by the heat is preferable.

At this time, a configuration of forming the state of the contact area direct fixation is not particularly limited, but various types of configuration including a known configuration such as welding, fusion, and melting joint can be used. For example, when the state of the contact area direct fixation by the heat is formed by welding, various welding configurations such as ultrasonic welding, heating-pressurizing welding, hot air welding, and high frequency welding can be adopted. When the state of the contact area direct fixation is formed by these configurations, the electrical wire 30 and the sheet. member 40 are in the state of the contact area direct fixation by these configurations. Specifically, when the state of the contact area direct fixation is formed by the ultrasonic welding, for example, the electrical wire 30 and the sheet member 40 are in the state of the contact area direct fixation by the ultrasonic welding. A portion where the state of the contact area direct fixation by the heat is formed by the welding (a fixing portion between the electrical wire 30 and the sheet member 40) may be referred to as a welding part, and herein, the fixing portion by the ultrasonic welding may be referred to as an ultrasonic welding part, and the fixing portion by the heating-pressurizing welding may be referred to as a heating-pressurizing welding part, for example.

In the case of the contact area direct fixation, only the resin included in the covering of the electrical wire 30 may be melted, or only the resin included in the sheet member 40 may be melted. In the case of the contact area direct fixation, both the resin included in the covering of the electrical wire 30 and the resin included in the sheet member 40 may be melted.

Herein, the sheet member 40 is formed into a band-like shape elongatedly extending straight. The shape of the sheet member is not limited to the band-like shape elongatedly extending straight, however, a curved shape or a shape made by combining a plurality of band-like parts is also applicable.

The route of the electrical wire 30 on the sheet member 40 may form a straight line, or a route midway bended is also applicable. The plurality of electrical wires 30 are midway branched on one main surface of the sheet member 40. Herein, the plurality of electrical wires 30 extend from one end portion 41a to the other end portion 41b of the sheet member 40. Some electrical wires 30 are betided toward one side portion 42a in an intermediate portion of the sheet member 40, and the other electrical wires 30 are bended toward the other side portion 42b in an intermediate portion of the sheet member 40. The remaining electrical wires 30 reach the other end portion 41b of the sheet member 40.

The plurality of connectors 20 are distinguished by the connectors 20A, 20B, 20C, and 20D for convenience. The electrical wires 30 are distinguished by the electrical wires 30a, 30b, 30c, 30d, 30e, and 30f. When the connector 20 and the electrical wire 30 need to be distinguished, they are distinguished by similar codes hereinafter.

One end portions of the plurality of electrical wires 30a, 30b, 30c, 30d, 30e, and 30f are connected to the connector 20A on a side of one end portion 41a of the sheet member 40. Herein, one end portions of the electrical wires 30a, 30b, 30c, 30d, 30e, and 30f extend to an outer side from one end portion 41a of the sheet member 40 and are connected to the connector 20A. The other end portions of the electrical wires 30a, 30b, 30c, 30d, 30e, and 30f extend to an outer side from the sheet member 40 and are connected to the connectors 20B, 20C, and 20D, respectively.

An arrangement of the plurality of electrical wires 30a, 30b, 30c, 30d, 30e, and 30f in the end surface 24 of the connector 20A is determined in accordance with an arrangement of one end portions of the plurality of electrical wires 30a, 30b, 30c, 30d, 30e, and 30f housed in the housing 22 (cavity 23) of the connector 20A.

An extension state of the electrical wires 30a, 30b, 30c, 30d, 30e, and 30f from the connector 20A is described hereinafter.

The electrical wire 30a is beaded at a portion immediately after extension from the connector 20A, and intersects with the other electrical wires 30c, 30d, 30e, and 30E The electrical wire 30b is bended at a portion immediately after extension from the connector 20A, and intersects with the other electrical wires 30c, 30d, 30e, and 30f. The electrical wire 30c is beaded at a portion immediately after extension from the connector 20A, and intersects with the other electrical wires 30a, 30h, 30d, 30e, and 30f. The electrical wire 30d is bended at a portion immediately after extension from the connector 20A, and intersects with the other electrical wires 30a, 30b, 30c, and 30f. The electrical wire 30e is bended at a portion immediately after extension from the connector 20A, and intersects with the other electrical wires 30a, 30b, 30c, and 30f. The electrical wire 30f is bended at a portion immediately after extension from the connector 20A, and intersects with the other electrical wires 30a, 30b, 30c, 30d, and 30e.

A position where these electrical wires 30a, 20b, 30c, 30d, 30e, and 30f intersect with each other is an example of the intersection position 32.

The electrical wires 30a, 30b, 30c, 30d, 30e, and 30f extend from the connector 20A, intersect with each other, and then extend on the sheet member 40 from one end portion 41a of the sheet member 40. That is to say, the intersection position 32 of the electrical wires 30a, 30b, 30c, 30d, 30e, and 30f is located between the end surface 24 of the connector 20 arid the sheet member 40. The electrical wires 30a, 30b, 30c, 30d, 30e, and 30f extend in parallel state (a parallel posture herein) from one end portion 41a toward the other end portion 41b of the sheet member 40, and are fixed to the sheet member 40.

Some electrical wires 30d and 30f are bended toward one side portion 42a of the sheet member 40 in the intermediate portion of the sheet member 40, and branched from the other electrical wires 30a, 30b, 30c, and 30e to extend in a posture being perpendicular to the other electrical wires 30a, 30b, 30c, and 30e. Then, the electrical wires 30d and 30f extend to the outer side from one side portion 42a of the sheet member 40, and are connected to the connector 20B. The arrangement in the other end portions of the electrical wires 30d and 30f is determined in accordance with the location of the other end portions of the electrical wires 30d and 30f housed in the connector 20B.

Some electrical wires 30a and 30b are bended toward the other side portion 42b of the sheet member 40 in a portion closer to a side of the other end portion 41b of the sheet member 40 in relation to the branch position of the electrical wires 30d and 30f, and branched from the other electrical wires 30c and 30e to extend in a posture being perpendicular to the other electrical wires 30c and 30e. Then, the electrical wires 30a and 30b extend to the outer side from the other side portion 42b of the sheet member 40, and are connected to the connector 20C. The arrangement in the other end portions of the electrical wires 30a and 30b is determined in accordance with the location of the other end portions of the electrical wires 30a and 30b housed in the connector 20C.

The remaining electrical wires 30c and 30e reach the other end portion 41b of the sheet member 40. Then, the electrical wires 30c and 30e extend to the outer side from the other side portion 41b of the sheet member 40, and are connected to the connector 20D. The arrangement in the other end portions of the electrical wires 30c and 30e is determined in accordance with the location of the other end portions of the electrical wires 30c and 30e housed in the connector 20D.

Herein, all the intersection positions 32 where the electrical wires 30a, 30b, 30c, 30d, 30e, and 30f intersect with each other are provided between the connector 20 and the sheet member 40. Thus, the intersection positions 32 where the electrical wires 30a, 30b, 30c, 30d, 30e, and 30f intersect with each other are not located on the sheet member 40.

Herein, an intersection position 32a where the electrical wire 30c and the electrical wire 30e intersect with each other in the plurality of intersection positions 32 is caused by a condition that the arrangement of the electrical wires 30c and 30e, whose one end portions are connected to the end surface 24 of the connector 20A, in the end surface 24 and the arrangement of the electrical wires 30c and 30e, whose other end portions are connected to the connector 20D are different from each other. That is to say, the intersection position 32a is a position where the plurality of electrical wires 30c and 30e intersect with each other for changing the arrangement between the connectors 20A and 20D when the arrangement in the connector 20A to which one end portions are connected and the arrangement in the connector 20D to which the other end portions are connected are different from each other in the case where both end portions of the electrical wires 30c and 30e are connected to the same connectors 20A and 20D, respectively. The same applies to the intersection position 32b of the electrical wires 30d and 30f. The intersection position 32c other than the intersection positions 32a and 32b in the plurality of intersection positions 32 is for branching the electrical wires 30 from each other.

According to the wiring member 10 having the above configuration, the intersection positions 32 of the electrical wires 30 are located near the end surface 24 where the electrical wires 30 are drawn in the connector 20. Herein, there is a case where the back side of the end surface 24 of the connector 20 is originally set to prevent entry of peripheral members 80 and 81 so that a portion of the wire-like transmission member 30 connected to the connector 20 is protected. This portion is set to the backward region BA and the intersection position 32 is disposed in the backward region BA, thus the backward region BA which tends to be a dead space can be effectively used. The number of intersection positions 32 disposed in a portion away from the backward region BA can be reduced. Accordingly, increase in an arrangement space for the wiring member 10 in which the electrical wire 30 is fixed on the sheet member 40 can be suppressed.

According to the wiring member 10, the connector 20 and the sheet member 40 are separated from each other, thus the intersection position 32 can be easily disposed outside the sheet member 40.

According to the wiring member 10, at least one intersection position 32 is provided between the connector 20 and the sheet member 40, thus the overlap of the intersection position 32 and the sheet member 40 can be suppressed, and increase in a thickness dimension in the intermediate portion of the wiring member 10 can be suppressed.

According to the wiring member 10, all the intersection positions 32 are provided between the connector 20 and the sheet member 40, thus none of the intersection positions 32 is located on the sheet member 40, and increase in a thickness dimension in the intermediate portion of the wiring member 10 can be suppressed.

Second Embodiment

Figure 4:
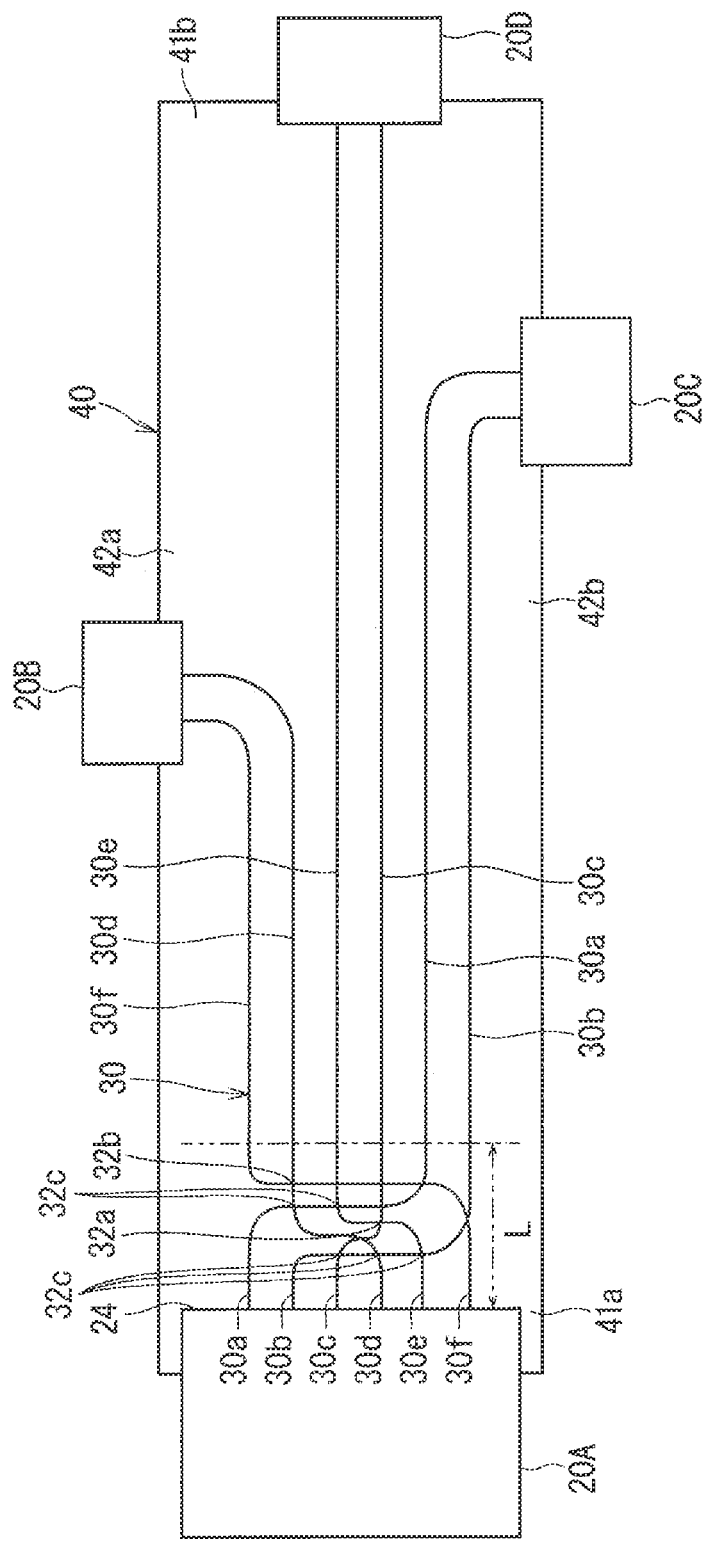
FIG. 4 A schematic plan view illustrating a wiring member according to a second embodiment.
Figure 5:
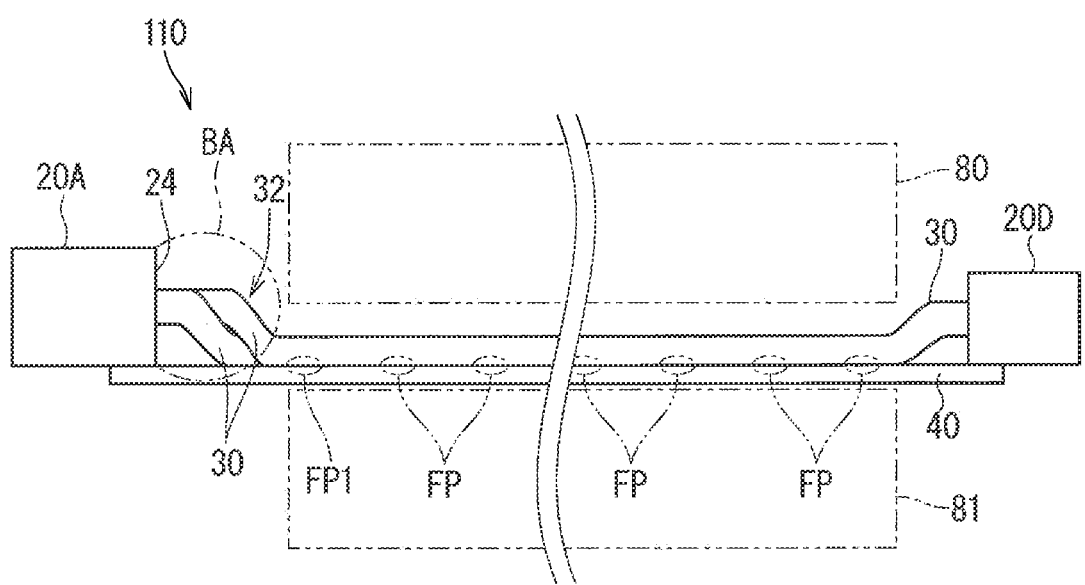
FIG. 5 A schematic side view illustrating a wiring member according to the second embodiment.

A wiring member according to a second embodiment is described. FIG. 4 is a schematic plan view illustrating a wiring member 110 according to the second embodiment. FIG. 5 is a schematic side view illustrating the wiring member 110 according to the second embodiment. In the following description of the present embodiment, the same reference numerals are assigned to the similar constituent elements described above, and the description thereof will be omitted.

In the present embodiment, an end portion including the end surface 24 of the connector 20A is located on the sheet member 40. That is to say, the end portion including the end surface 24 of the connector 20A and the sheet member 40 are not separated from each other in the extension direction of the wire-like transmission member 30. Herein, end portions of the connectors 20B are also located on the sheet member 40. However, the end portions of some connectors 20 in the connectors 20A, 20B, 20C, and 20D need not be located on the sheet member 40.

The end portion of the connector 20 located on the sheet member 40 may be or may not be fixed to the sheet member 40.

When the end portion of the connector 20 is fixed to the sheet member 40, a fixing means thereof is not particularly limited. The end portion of the connector 20 may be fixed to the sheet member 40 by an adhesive agent and a double-sided tape, or may also be fixed by welding the housing 22 to the sheet member 40, for example.

In this manner, when the end portion including the end surface 24 of the connector 20 is located on the sheet member 40, the intersection position 32 is also located on the sheet member 40. The state where the intersection position 32 is located on the sheet member 40 also includes a state where the intersection position 32 is disposed on the main surface of the sheet member 40 and a state where the intersection position 32 is separated from the main surface of the sheet member 40. Even in the case where the intersection position 32 is located on the sheet member 40, the intersection position 32 is disposed on the backward region BA of the connector 20, thus increase in the arrangement space for the wiring member 10 in which the electrical wire 30 is fixed on the sheet member 40 can be suppressed.

According to the wiring member 110, the connector 20 is located on the sheet member 40, thus the position of the connector 20 can be easily recognized. Particularly, when the connector 20 is fixed on the sheet member 40, the connector 20 can be positioned.

When the intersection position 32 is located on the sheet member 40, a portion of the electrical wire 30 including the intersection position 32 may be or may not be fixed to the sheet member 40. In the example illustrated in FIG. 5, the portion of the electrical wire 30 including the intersection position 32 is not fixed to the sheet member 40. Thus, a portion of the electrical wire 30 closer to a side of the connector 20A in relation to the intersection position 32 is not fixed to the sheet member 40.

In the example illustrated in FIG. 5, a fixing position FP of the electrical wire 30 and the sheet member 40 is illustrated by an alternate long and two short dashes line. At this time, in the example illustrated in FIG. 5, a fixing position FP1, which is closest to the end surface 24 of the connector 20A in the fixing position FP of the electrical wire 30 and the sheet member 40, and the end surface 24 of the connector 20A are separated from each other, and the intersection position 32 is disposed therebetween. In the example illustrated in FIG. 5, the fixing position FP is intermittently provided along the extension direction of the electrical wire 30, but may also be sequentially provided. In this case, the portion closest to the end surface 24 of the connector 20A in the fixing positions which are sequentially formed can be set to the fixing position closest to the end surface 24 of the connector 20A in the fixing positions of the electrical wire 30 and the sheet member 40.

A dimension between a portion of the electrical wire 30 located in an opening of the cavity 23 and a portion of the sheet member 40 located in the fixing position FPI closest to the end surface 24 of the connector 20A is set longer than a shortest distance from the opening of the cavity 23 to the fixing position FPI. Accordingly, a rapid bending of the electrical wire 30 is suppressed, and damage on the electrical wire 30 caused by friction against a peripheral edge of the opening of the cavity 23 can be suppressed.

Third Embodiment

Figure 6:
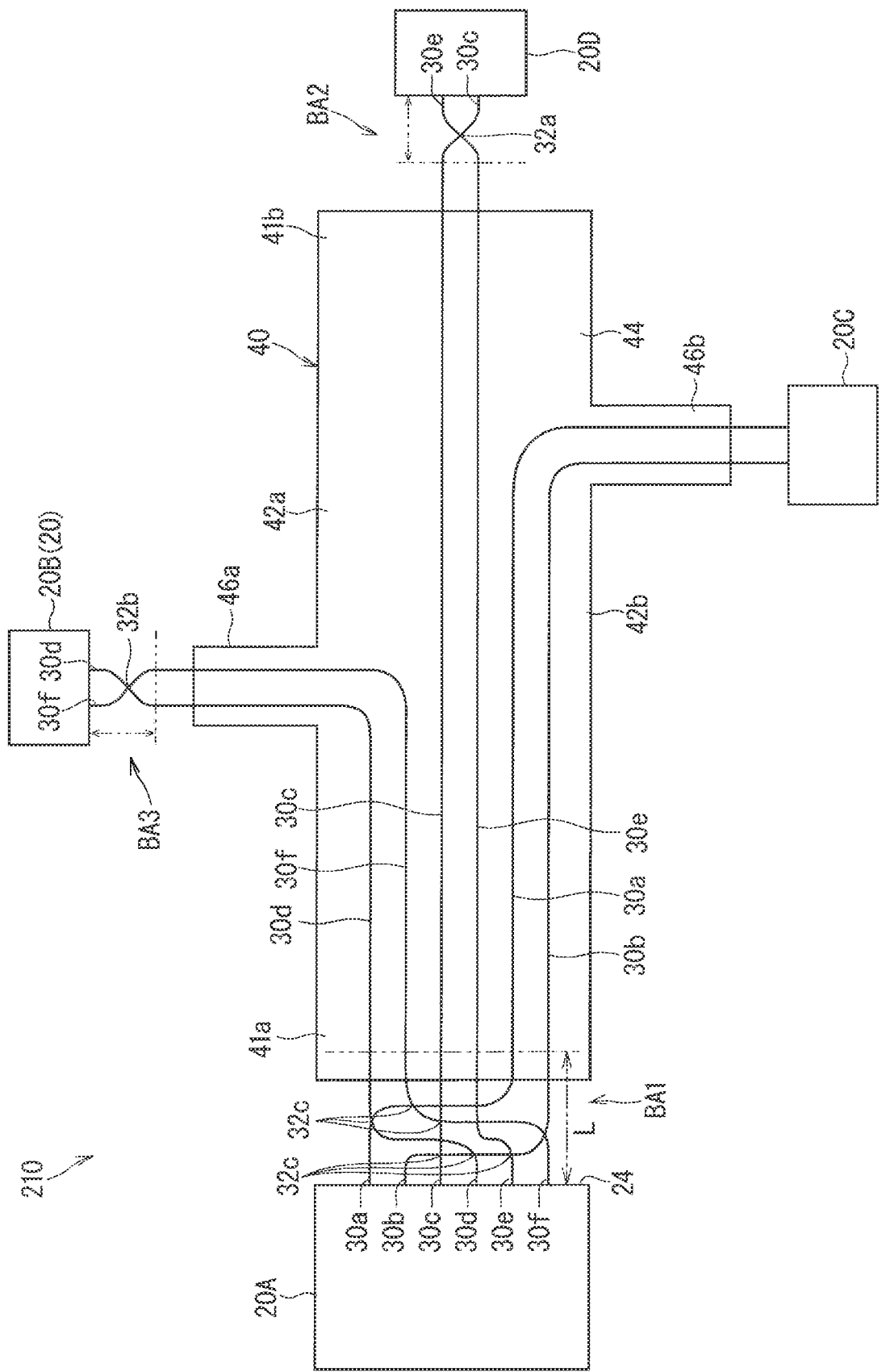
FIG. 6 A schematic plan view illustrating a wiring member according to a third embodiment.

A wiring member according to a third embodiment is described. FIG. 6 is a schematic plan view illustrating a wiring member 210 according to the third embodiment. in the following description of the present embodiment, the same reference numerals are assigned to the similar constituent elements described above, and the description thereof will be omitted.

In the above description, the plurality of intersection positions 32 are located in only the backward region BA in one connector 20A, however, this configuration is not necessary. The plurality of intersection positions 32 may be located separately in the backward regions BA in the plurality of connectors 20. In this manner, the plurality of intersection positions 32 are located separately in the backward regions BA in the plurality of connectors 20, thus a concentration of the plurality of intersection positions 32 in the backward region BA in one connector 20A can be suppressed.

In the present example, some of the plurality of intersection positions 32 are provided in a backward region BA1 in the connector 20A, other some of the plurality of intersection positions 32 are provided in a backward region BA2 in the connector 20D, and the remaining intersection positions 32 are provided in a backward region BA3 in the connector 20B.

Particularly, in the present example, the intersection position 32a of the electrical wire 30c and the electrical wire 30e in the plurality of intersection positions 32 is provided in the backward region BA2 in the connector 20D. The intersection position 32b of the electrical wire 30d and the electrical wire 30f in the plurality of intersection positions 32 is provided in the backward region BA3 in the connector 30B. The remaining intersection point 32c is provided in the backward region BA1 in the connector 20A.

That is to say, in the present example, the intersection point 32c for branching is provided in the backward region BA1 in the connector 20A. The intersection points 32a and 32b caused by a change in arrangement between the two connectors 20 are provided in the backward regions BA2 and BA3 in the connectors 20D and 20B.

In the present example, a shape of a sheet member 240 is different from that of the sheet member 40 described above. More specifically, the sheet member 240 includes a first sheet-like part 44 and second sheet-like parts 46a and 46b.

Herein, the first sheet-like part 44 is formed into a band-like shape elongatedly extending straight. The first sheet-like part may be bended. The first sheet-like part 44 is formed into a shape similar to that of the sheet member 40 described above, and one end portion 41a, the other end portion 41b, one side portion 42a, and the other side portion 42b of the sheet member 40 correspond to one end portion 41a, the other end portion 41b, one side portion 42a, and the other side portion 42b of the first sheet-like part 44, respectively.

The second sheet-like parts 46a and 46b are bended in an intermediate portion of the first sheet-like part 44 in an extension direction, and branched to a lateral side of the first sheet-like part 44. The second sheet-like parts 46a and 46b are formed into a band-like shape elongatedly extending straight. One second sheet-like part may be provided, or three or more sheet-like parts may also be provided. When the plurality of second sheet-like parts are provided, the plurality of second sheet-like parts may be provided separately in both side portions 42a and 42b of the first sheet-like part 44, or only in one side portion 42a or the other side portion 42b of the first sheet-like part 44.

The second sheet-like part 46a is branched to extend toward the outer side of one side portion 42a of the first sheet-like part 44 from the intermediate portion of one side portion 42a of the first sheet-like part 44 in the extension direction. The second sheet-like part 46b is branched to extend toward the other outer side of the first sheet-like part 44 from the intermediate portion of the other side portion 42b of the first sheet-like part 44 in the extension direction.

Herein, the second sheet-like parts 46a and 46b are provided in different positions in the extension direction of the first sheet-like part 44, Herein, the second sheet-like part 46a is provided close to one end portion 41a of the first sheet-like part 44, and the second sheet-like part 46b is provided close to the other end portion 41b of the first sheet-like part 44. When the plurality of second sheet-like parts are provided separately in both side portions 42a and 42b of the first sheet-like part 44, the two second sheet-like parts in the plurality of second sheet-like parts may be provided in the same position in the extension direction of the first sheet-like part.

The second sheet-like parts 46a and 46b extend in a posture being perpendicular to the extension direction of the first sheet-like part 44. The second sheet-like part may extend in an oblique direction in relation to the extension direction of the first sheet-like part.

Modification Example

Figure 7:
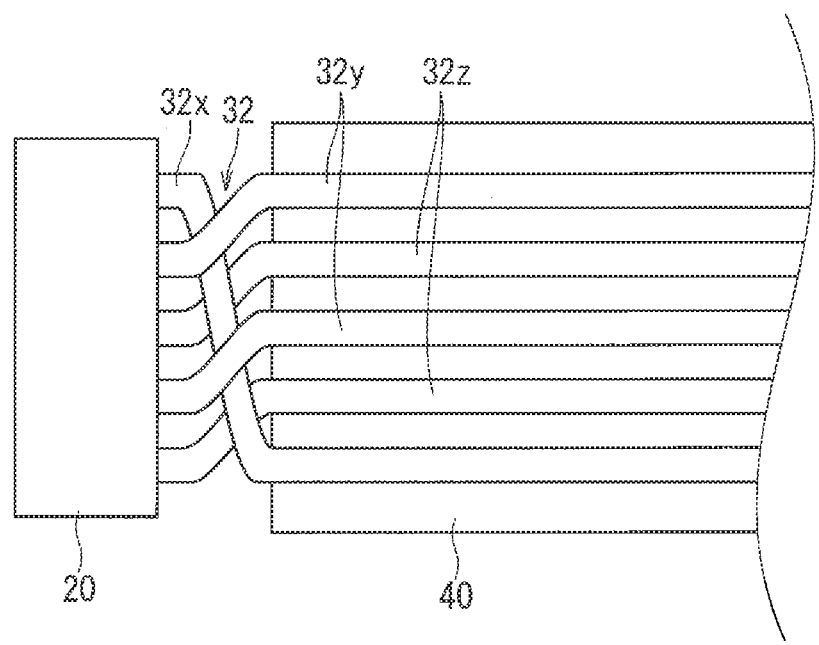
FIG. 7 A schematic plan view illustrating a modification example of the wiring member.

FIG. 7 is a schematic plan view illustrating a modification example of the wiring member 10.

In the present example, when one electrical wire 30x intersects with the plurality of electrical wires 30, one electrical wire 30x passes through one side of first electrical wires 30y and passes through the other side of second electrical wires 30z. In the manner, one electrical wire 30x intersects to thread its way through the first electrical wires 30y and the second electrical wires 30z, thus the shape of the intersection position 32 can be held easily, and the intersection position 32 is hardly disjoined. Accordingly, a large load hardly occurs in the electrical wire 30 when the connector 20 is pulled, for example.

Moreover, in the above description, the region within the predetermined dimension L from the end surface 24 of the connector 20 is set as the backward region BA, however, this configuration is not necessary. The other region may be set as the backward region BA.

For example, there is a case where the connector 20 and the sheet member 40 are provided separately along the extension direction of the wire-like transmission member as with the case in the first embodiment. In this case, the region between the connector 20 and the sheet member 40 can also be set as the backward region BA.

For example, there is a case where the fixing position FP1, which is closest to the end surface 24 of the connector 20 in the fixing positions FP of the sheet member 40 and the wire-like transmission member 30, and the end surface 24 of the connector 20 are separated from each other as is the case in the second embodiment. In this case, the region between the fixing position FP1 and the end surface 24 can also be set as the backward region BA.

In the above description, all of the intersection positions 32 are disposed in the backward region BA, however, this configuration is not necessary, Some of the intersection positions 32 may be disposed outside the backward region BA. In this case, it is sufficient that the intersection position 32 disposed outside the backward region BA is disposed in a portion having a relatively large arrangement space in the wiring member. That is to say, it is sufficient that a portion of the wiring member other than the backward region includes a first part and a second part having relatively larger arrangement space than the first part, and the intersection position disposed outside the backward region BA is disposed only in the second part in the first part and the second part. Accordingly, suppressed is the arrangement of the intersection position in the first part having a relatively small arrangement space, and the intersection position hardly has contact with the peripheral member.

The configurations described in the embodiments and modification examples thereof can be appropriately combined as long as they are not contradictory.

Although the present invention is described in detail, the foregoing description is in all aspects illustrative and does not restrict the invention. it is therefore understood that numerous modifications and variations can be devised without departing from the scope of the invention.

EXPLANATION OF REFERENCE SIGNS 10 wiring member
20, 20A, 20B, 20C, 20D connector
24 end surface
30, 30a, 301b, 30c, 30d, 30e, 30f electrical wire (wire-like transmission member)
32, 32a, 32b, 32c intersection position
40, 240 sheet member
BA backward region

The invention claimed is:

1. A wiring member, comprising:
a first connector;
a second connector;
a plurality of wire-like transmission members extending from the first connector; and
a sheet member in which the plurality of wire-like transmission members extending from the first connector are disposed and fixed on a main surface in a state where an arrangement of the plurality of wire-like transmission members is changed to be different from an arrangement in an end surface of the first connector, wherein at least one intersection position in which the plurality of wire-like transmission members intersect with each other for changing the arrangement of the plurality of wire-like transmission members is located in a backward region of the end surface of the first connector, the at least one intersection position includes an intersection position formed of one wire-like transmission member in the plurality of wire-like transmission members intersecting with two or more wire-like transmission members, which are different from the one wire-like transmission member, in the plurality of wire-like transmission members in different positions, and the at least one intersection position includes an intersection position of the plurality of wire-like transmission members whose one end portions are connected to the first connector and other end portions are connected to the second connector.

2. The wiring member according to claim 1, wherein the first connector is provided separately from the sheet member.

3. The wiring member according to claim 2, wherein the at least one intersection position is provided between the first connector and the sheet member.

4. The wiring member according to claim 3, wherein all of the intersection positions are provided between the first connector and the sheet member.

5. The wiring member according to claim 1, wherein an end portion including the end surface of the first connector is located on the sheet member.

6. The wiring member according to claim 1, wherein the backward region is located between a fixing position, which is closest to the end surface of the first connector in fixing positions of the sheet member and each of the wire-like transmission members, and the end surface of the first connector.

* * * * *